US007085253B2

(12) United States Patent
Yang

(10) Patent No.: US 7,085,253 B2
(45) Date of Patent: Aug. 1, 2006

(54) SYSTEM AND METHOD FOR NOTIFYING A USER OF THE STATUS OF OTHER MOBILE TERMINALS

(75) Inventor: Jun-Yong Yang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 974 days.

(21) Appl. No.: 10/000,921

(22) Filed: Nov. 2, 2001

(65) Prior Publication Data

US 2003/0086402 A1    May 8, 2003

(51) Int. Cl.
*H04Q 7/24*    (2006.01)
(52) U.S. Cl. ...................................... 370/338; 370/389
(58) Field of Classification Search .................... None
See application file for complete search history.

(56) References Cited

U.S. PATENT DOCUMENTS

| | | | | |
|---|---|---|---|---|
| 5,953,322 | A * | 9/1999 | Kimball | 370/328 |
| 6,032,051 | A | 2/2000 | Hall et al. | |
| 6,385,461 | B1 * | 5/2002 | Raith | 455/518 |
| 6,765,896 | B1 * | 7/2004 | Ahmed et al. | 370/338 |
| 6,898,275 | B1 * | 5/2005 | Dolan et al. | 379/211.02 |
| 2001/0024951 | A1 | 9/2001 | Rignell et al. | |

FOREIGN PATENT DOCUMENTS

WO    WO 01/72055    9/2001

OTHER PUBLICATIONS

European Search Report dated Nov. 13, 2003 issued in a counterpart application, namely Appln. No. 02008861.3.
Digital Cellular Telecommunications System; (Phase 2+)(GSM); Universal Mobile Telecommunications System (UMTS); General Packet Radio Service (GPRS); Service Description; Stage 2 (3 GPP TS 23.060 version 3.6.0 Release 1999), Jan. 2001.

* cited by examiner

*Primary Examiner*—Chau Nguyen
*Assistant Examiner*—Rhonda Murphy
(74) *Attorney, Agent, or Firm*—Dilworth & Barrese LLP

(57) ABSTRACT

A system and method for easily checking the status of another party (e.g., driving or in conference) or the operational status of his terminal (e.g., busy, power-off, or reception rejected) without dialing the other party over an Internet Protocol (IP) network is provided. A mobile terminal generates a status information packet (SIP) and broadcasts the SIP over the IP network where other terminals receive the SIP and acquire the terminal's status without dialing. The states of other terminals can be displayed periodically in characters, icons or images on the LCD of a particular terminal or can be notified to a user by sounds or voice data.

16 Claims, 7 Drawing Sheets

SYSTEM AND METHOD FOR NOTIFYING A USER OF THE STATUS OF OTHER MOBILE TERMINALS

BACKGROUND OF THE INVENTION

1. Field of the Invention

The present invention relates generally to a mobile communication system, and in particular, to a system and method for easily checking the status of another party (e.g., driving or in conference) or the operational status of his terminal (e.g., busy, power-off, or reception rejected) without dialing the other party over an Internet Protocol (IP) network.

2. Description of the Related Art

In general, there is no way of knowing the status of a called terminal in a mobile communication system without dialing the terminal. If a caller dials the called terminal, an exchange checks the status of the called terminal and notifies the caller of the status of the called terminal (e.g., power-off, busy or no answer) by an ARS (Audio Response System) voice message. In the case of an additional service such as call forwarding, the caller cannot know the status of the called terminal either.

In another aspect of the mobile communication system, after the caller transmits an SMS (Short Message Service) message, he cannot know whether the SMS message has arrived at a destination successfully or if the called party has read it. Even if the called terminal is in an SMS message rejection state, the caller transmits the SMS message in vain. Moreover, if the called party sets his terminal to various states including "reception rejected", "in conference", "call forwarding to . . . ", or "driving", the caller does not realize that the called party is not available until he dials the called terminal.

The above conventional technology exhibits the following problems:

For a voice call service: The caller is not informed that the called terminal is set to call forwarding, is unavailable for answering (or power-off), or is busy by an ARS voice message from a network until he dials the called terminal.

For a SMS message transmission: There is no knowing whether an SMS message has arrived at the called terminal. Depending on the configuration of called terminal, the caller may wonder whether the called party receives the SMS message the moment the caller transmits it, or whether the SMS message just reaches an SMS center, if the called terminal is in the power-off state.

In either of the above-mentioned services, there is no way for the called party to notify the caller of his current status like "reception rejected", "in conference", "call forwarding to . . . ", or "driving".

SUMMARY OF THE INVENTION

Accordingly, it is an object of the present invention to provide a system and method for a caller to easily check the status of a called terminal or a called party without dialing.

Another object of the present invention is to provide a system and method for a caller to determine whether an SMS message has reached the called party.

A further object of the present invention is to provide a system and method for a user to notify another party of his own status such as "reception rejected", "in conference", "call forwarding to . . . ", or "driving" without having the other party dial the user's phone number.

The foregoing and other objects are achieved by a system and method for enabling a user to check the status of another party without dialing the other party by periodically broadcasting and receiving state information, i.e., status information, of both parties in a point-to-point or point-to-multipoint manner over an IP (Internet Protocol) network.

According to one aspect of the present invention, a mobile communication system for viewing the status of a plurality of mobile terminals over an Internet Protocol (IP) network is provided. The system includes an IP server for receiving a phone number and assigning a unique IP address corresponding to the phone number to at least one of the plurality of mobile terminals and the at least one mobile terminal for generating a status information packet (SIP) representing a status of the at least one mobile terminal. One terminal generates a SIP and broadcasts the SIP over the IP network where other terminals receive the SIP and acquire the terminal's status without dialing. The states of other terminals can be displayed periodically in characters, icons or images on the LCD of a particular terminal or can be notified to a user by sounds or voice data.

According to another aspect of the present invention, a method for viewing the status of a plurality of mobile terminals over an Internet Protocol (IP) network is provided. The method includes the steps of assigning IP addresses to the plurality of mobile terminals; requesting the IP addresses of the plurality of mobile terminals by at least one of the plurality of mobile terminals, broadcasting a status information packet from each of the plurality of mobile terminals over the IP network; receiving at the at least one mobile terminal the status information packets of the plurality of mobile terminals; and displaying the status information of the plurality of mobile terminals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

An IP (Internet Protocol) network is a backbone for the post-2.5$^{th}$ and 3$^{rd}$ generation wireless systems including GPRS (General Packet Radio Service), IS-95C, CDMA2000, and UMTS (Universal Mobile Telecommunication Service), whether wired or wireless. For example, a GPRS network provides a packet switched service based on IP. GPRS terminals include an IP/X. 25 stack. The IP/X. 25 stack is also included in a GGSN (Gateway GPRS Support Node) interfacing between GPRS backbone networks. Therefore, a GPRS terminal is connected to the GPRS network all the time. If it is to receive a data service other than a voice call service, for example, for the purpose of reading a Web page, the GPRS terminal is assigned to an IP address.

While GPRS only has been described, it is to be understood that the present invention is applicable to any wired/wireless service over an IP network.

Since the terminals assigned IP addresses are online continuously with a connection to the IP network, they are able to send and receive IP packets over the IP network at all times. The present invention is designed to broadcast IP packets including at least one terminal's status information periodically, and to notify only selected other terminals of the at least one terminal's status information.

Figure 1:
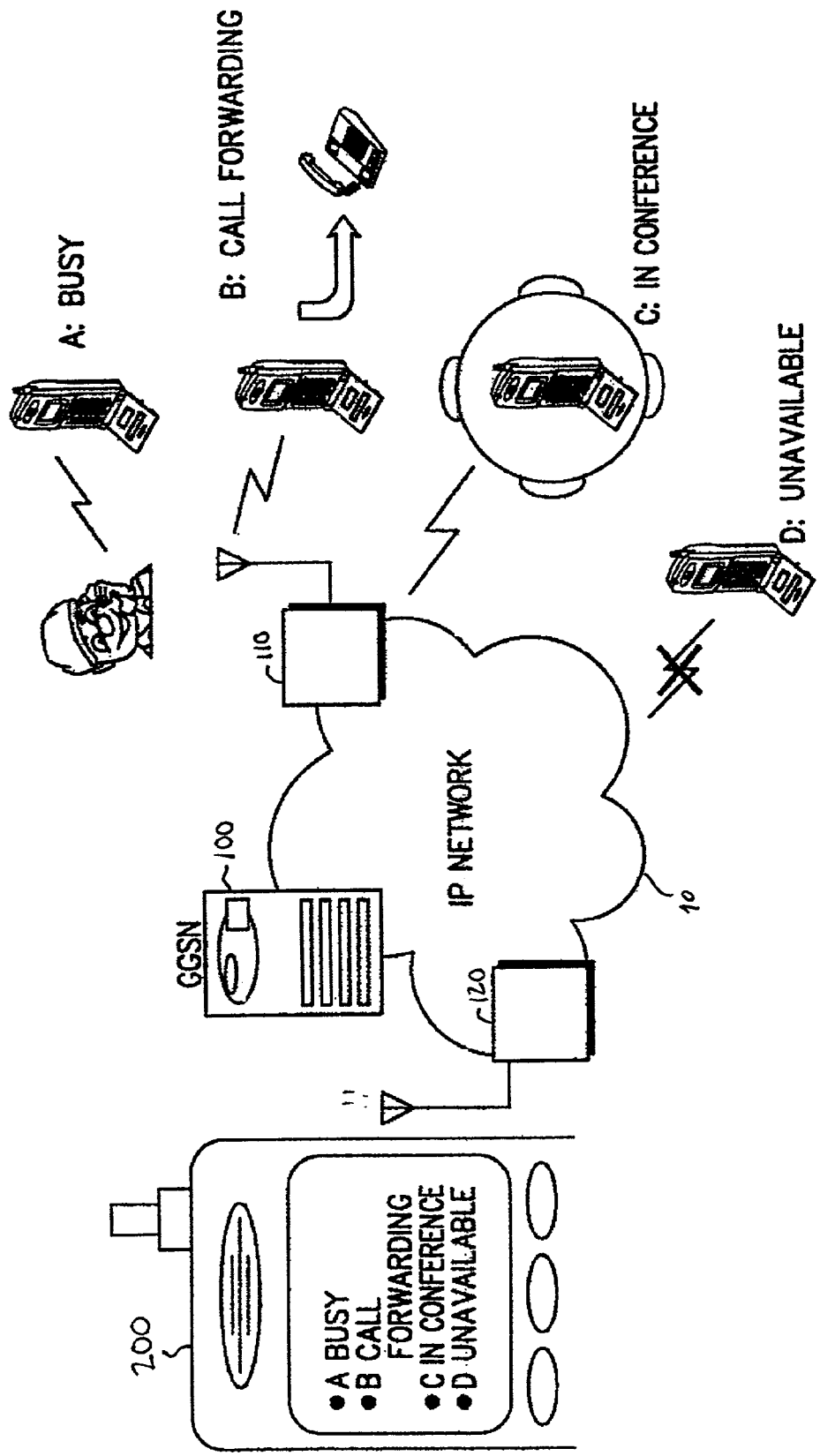
FIG. 1 is a block diagram illustrating a mobile communication system where the statuses of mobile terminals can be viewed by a particular terminal according to the present invention.

Referring now to the drawings, in which like reference numerals identify identical or similar elements throughout the views, FIG. 1 is a block diagram illustrating a mobile communication system where the statuses, or states, of mobile terminals can be viewed by a particular terminal according to the present invention.

As shown in FIG. 1, the states of other terminals A, B, C, D in an IP network 10 are displayed periodically in characters, icons, or images on the LCD of a particular terminal 200 or notified to a user by sounds or voice data. The IP network 10 includes an IP network server 100, herein presented as a GGSN being a GPRS server, a plurality of BTSs (Base Transceiver Subsystems) 110, 120, and a plurality of terminals A, B, C, D connected wirelessly to the BTSs. Accordingly, a user of terminal 200 knows the states of the terminals A, B, C, D without dialing. The states of the terminals are set automatically or manually by their users. That is, the states of the terminals (A: "busy", B: "call forwarding", C: "in conference", and D: "unavailable") can be known by user terminal 200 according to the present invention without the user of terminal 200 dialing the other terminals A, B, C, D.

To do so, the system and method of the present invention utilizes a novel Status Information Packet (hereafter, "SIP") containing status information of the terminal or user. SIP is defined according to User Datagram Protocol (UDP) application protocol. One terminal generates a SIP containing status information and broadcasts the SIP over the IP network. Then, other terminals receive the SIP over the IP network and acquire the terminal's status using the SIP without dialing.

Figure 2:
FIG. 2 illustrates the structure of a Status Information Packet (SIP) according to the present invention.

The novel SIP is formatted as shown in FIG. 2, where:

An IP field is an IP header including the IP address of a terminal;

An UDP field is a UDP header indicating that the packet is a UDP packet;

A STS field is the STS header of the proposed status packet. By providing a STS header, a field representing an STS protocol, its version and date, a source IP, a destination IP, and ID (or phone number) can be defined.

A Status Information field is an STS packet data field. This field contains the status information contents of the terminal. A plurality of statuses can be set by representing each status in bits. If each state is represented as a sequence number, 256 states can be set with one byte.

Hereinbelow, with reference to FIG. 3, a description will be made of the structures and operations of a network system and a terminal that perform the function of the present invention.

Figure 3:
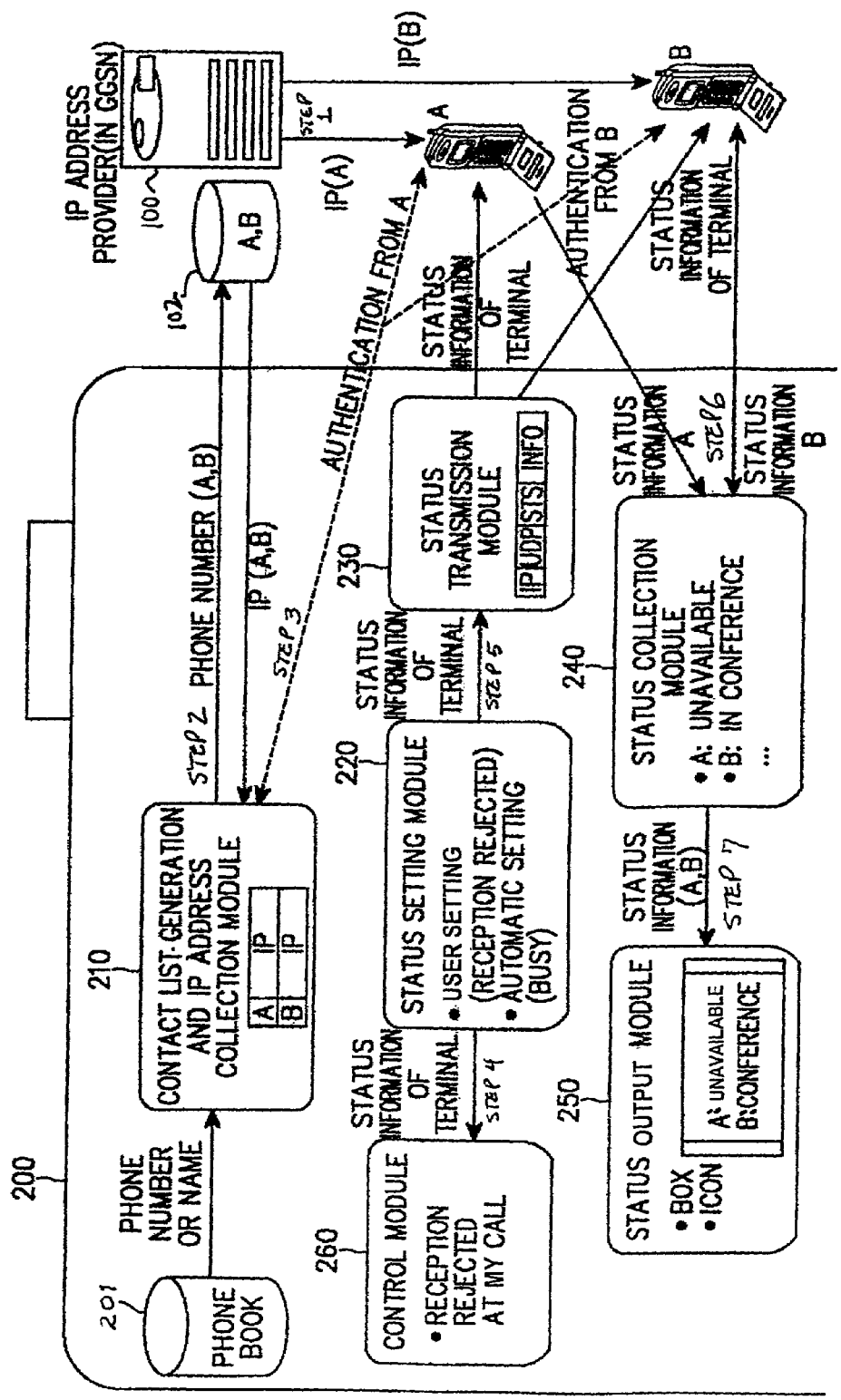
FIG. 3 illustrates the structures and operations of a network system and a terminal that perform the method of the present invention.

In FIG. 3, the network system includes an IP server 100 and mobile terminals 200, A and B wirelessly connected to the IP network. The IP server 100 exists in a GGSN (Gateway GPRS Support Node). When a terminal 200 is powered-on, the IP server 100 receives the terminal's phone number and assigns a unique IP address corresponding to the phone number to the terminal. The IP server 100 also maintains the IP information of the terminal in a database 102.

The mobile terminal 200 includes a phone book 201, a contact list generation and IP address collection module 210, a status setting module 220, a status transmission module 230, a status collection module 240, a status output module 250, and a control module 260.

The contact list generation and IP address collection module 210 generates a contact list and collects IP addresses of other mobile terminals connected to the IP network. A user adds, edits, or deletes names in the contact list in association with status viewing. For adding, the user enters a contact list menu and selects an intended name or phone number from the phone book 201 or directly inputs a favorite phone number. In the same manner, the user can delete a name or phone number from the contact list. The IP address of the phone number added to the contact list is requested and returned by the IP server.

The status setting module 220 has an automatic setting function with respect to the present operational status of the terminal (e.g., busy and SMS reception completed), and a user-desired status setting function (e.g., "reception rejected", "SMS reception rejected", "in conference, and driving"). The procedure for setting the status of the terminal, either automatically or manually, will be described in detail below with reference to FIGS. 6 and 7.

The status transmission module 230 generates a status information packet (SIP) representing the status of the terminal set in the status setting module 220 according to a defined UDP application protocol as shown in FIG. 2. If the user selects a plurality of status items like "in conference", "reception rejected", and "SMS reception rejected" in the user setting menu, the status transmission module 230 generates a status information packet representing the plurality of statuses. In the automatic status setting mode, every time the user selects the contact list, the status transmission module 230 interrogates him about call forwarding in a supplemental service and if it obtains the current call forwarding status, it generates a suitable SIP (status information packet). If the line is busy, the status transmission module 230 generates a status information packet representing "busy". If the present terminal status is "available" with respect to call answering or SMS reception, the status transmission module 230 generates an appropriate SIP (status information packet) representing the status. The SIP is periodically broadcasted over the IP network. Preferably, the status transmission module 230 broadcasts the SIP containing the preset status information of the terminal every a few seconds (or every tens of seconds) over the IP network.

The status collection module 240 collects the status information of each terminal included in the contact list. The status information includes a terminal status (unavailable, available, SMS receivable, etc.), a user-desired status (in conference, driving, call answering rejected, SMS reception rejected, etc.), and a call status (call forwarding).

If there is an STS packet in the received UDP data, the status collection module 240 extracts a source IP address and its ID from an STS header. The status collection module 240 extracts status information from STS data following the STS header and compares it with an IP address in the contact list. If the received IP address is included in the contact list, the status collection module 240 constructs a status information table for the IP address and its ID.

The status output module 250 includes an LCD, a speaker and an earphone. The phone numbers or user-defined phone numbers in the contact list are displayed on the LCD. It marks icons or messages representing statuses for each parties phone number in a contact list viewer. Thus, the received status information from the other parties is displayed in an icon or a message in the contact list viewer. For example, if a status information packet expected to be received periodically has not arrived, the corresponding terminal is marked as unavailable or powered-off. Additionally, the received status information may be provided to the user by audio data.

After the terminal statuses are set as any one of "answering rejected", "busy", "SMS reception rejected", and "in conference", etc., the control module 260 controls the terminal to operate adaptively by programs upon incoming of a call or an SMS message.

Figure 7:
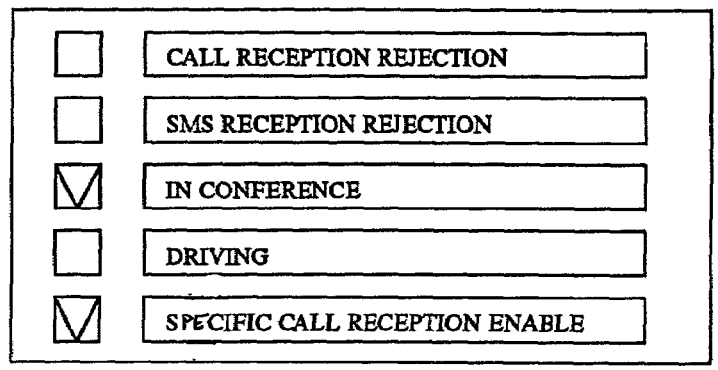
FIG. 7 illustrates a user status setting menu display of a mobile terminal according to the present invention.
Figure 4:
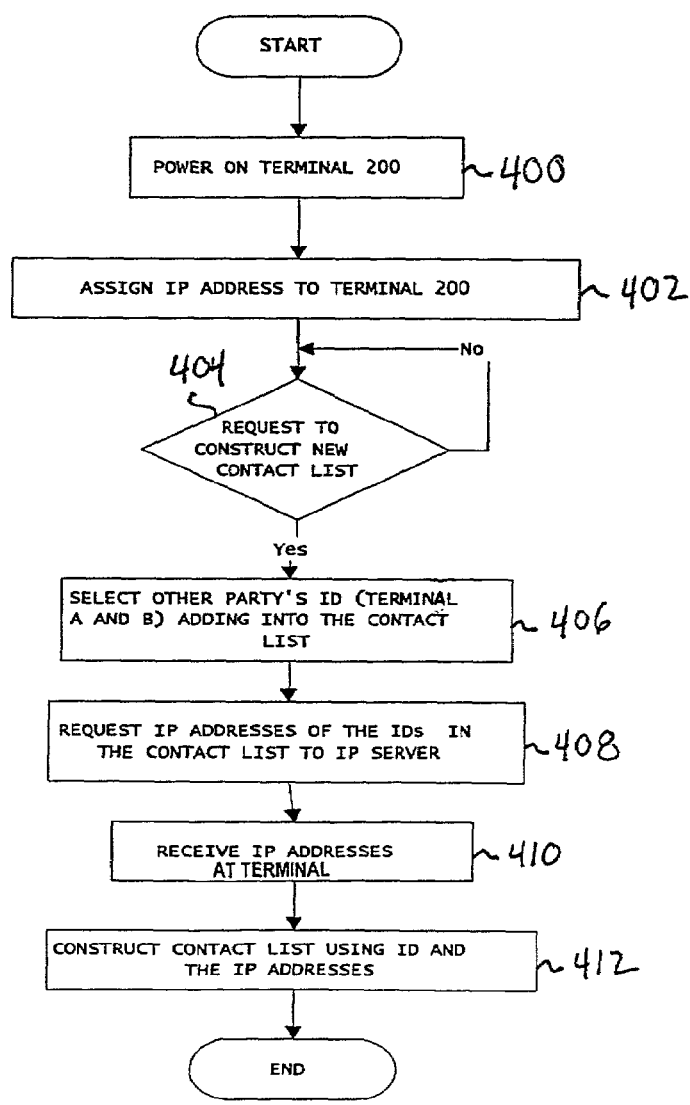
FIG. 4 is a flowchart illustrating a terminal initialization and contact list construction procedure according to the present invention.
Figure 5:
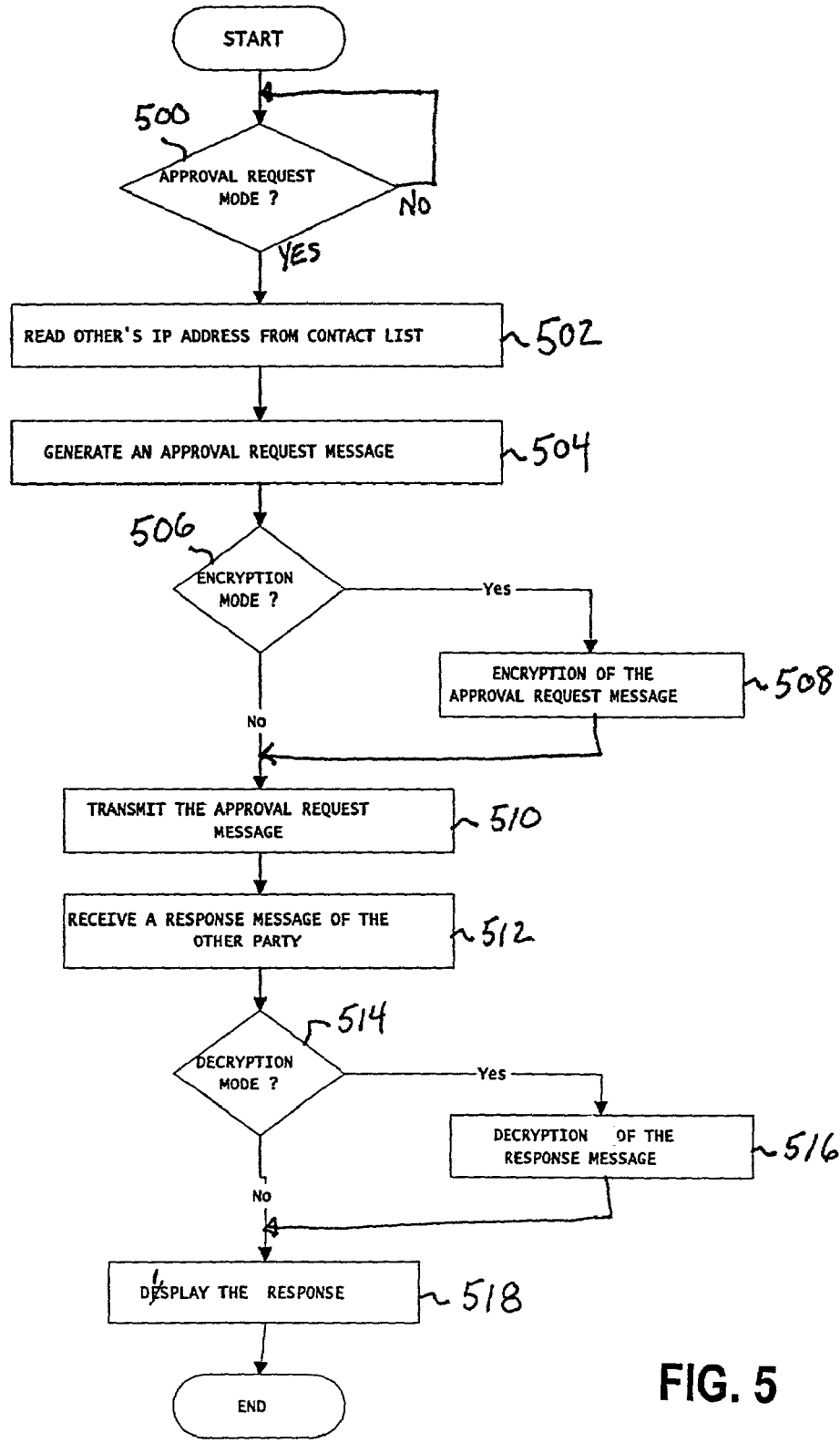
FIG. 5 is a flowchart illustrating an approval procedure between mobile terminals according to the present invention.
Figure 6:
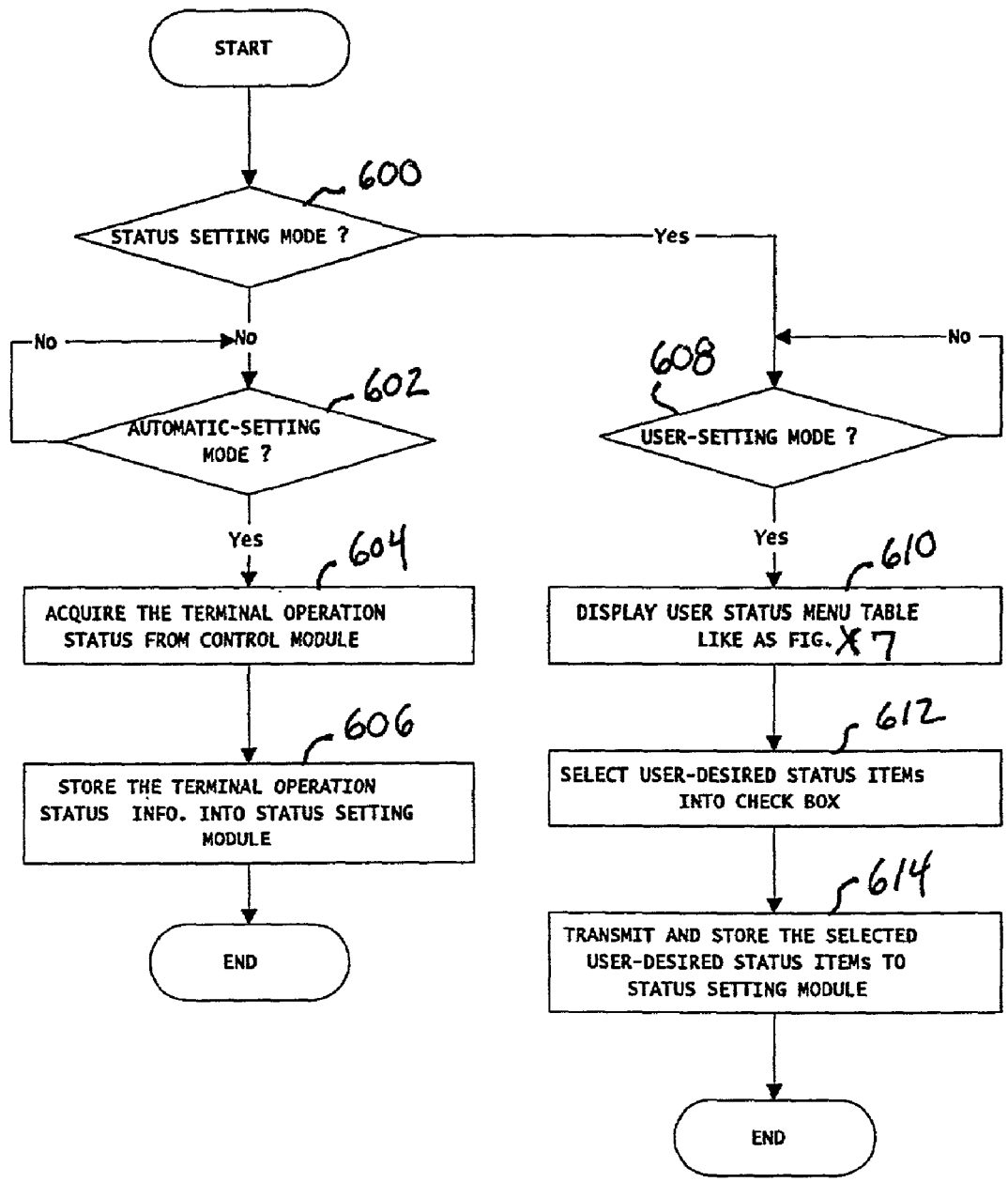
FIG. 6 is a flowchart illustrating a terminal status setting procedure according to the present invention.
Figure 8:
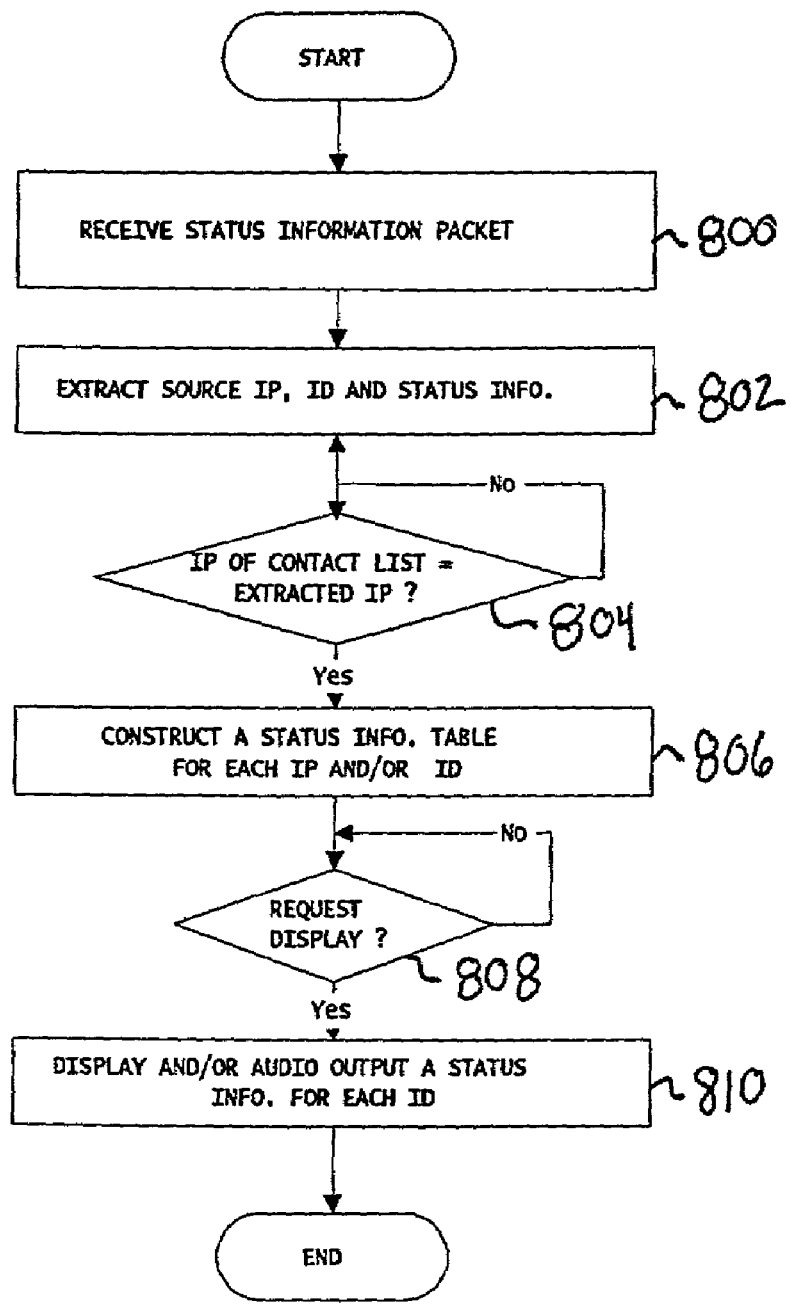
FIG. 8 is a flowchart illustrating a status information collection and output procedure according to the present invention.

With continued reference to FIG. 3, the operational steps to carry out the method of the present invention will be described in conjunction with the above described system and FIGS. 4 through 8. FIG. 4 is a flowchart illustrating a terminal initialization and contact list construction procedure, FIG. 5 is a flowchart illustrating an approval procedure between mobile terminals, FIG. 6 is a flowchart illustrating a terminal status setting procedure, FIG. 7 illustrates a user status setting menu display of a mobile terminal, and FIG. 8 is a flowchart illustrating a status information collection and output procedure.

Step 1. Terminal Initialization

As shown in FIG. 4, when terminal 200 is powered-on in step 400, the IP server 100 of the GGSN receives the terminal's phone number and assigns a unique IP address corresponding to the phone number to the terminal in step 402. After the terminal is initialized, it is requested to construct a new contact list in step 404. If a request is received, the process moves to step 406.

Step 2. Contact List Generation and IP Addresses Collection

In step 406, the user of the terminal 200 enters into a contact list menu to generate a new contact list. The user adds interested other terminals to the contact list by selecting phone numbers or names from the phone book 201 or by directly entering them. Then, the terminal 200 transmits the phone numbers or names entered in the contact list to the IP server 100 to thereby request IP addresses for the terminals A, B in step 408.

The IP server 100 searches for the IP addresses of the requested terminals A, B from the database 102 and transmits them to the terminal 200 in step 410. In step 412, the terminal 200 constructs the contact list by matching the IP addresses to the IDs (phone number or names).

Step 3. Approval

Referring to FIG. 5, the terminal 200 enters into an approval request mode in step 500 to determine whether the terminals A and B permit their status information to be broadcast to the terminal 200. In step 502, the terminal 200 reads the IP addresses of other terminals from the contact list, and generates an approval request message in step 504. In step 506, it is determined whether encryption is to be added to the approval request message, and if so will be added in step 508.

In step 510, the approval request message is transmitted to the other terminals A, B. The terminals A, B will transmit an "OK" response messages if the terminals are permitting their status information to be broadcast in step 512. Otherwise, a "NO" response message will be returned to the terminal 200.

If an "OK" response message is received, it will be determined if decryption of the response message is necessary in step 514 and the message will be decrypted in step 516. In step 518, the response message will be displayed to the user of terminal 200.

Step 4. Status Setting

The status of the terminal 200 are automatically set by the control module 260, and manually set by the user, in cooperation with the status setting module 220. User-desired status setting examples include "answering rejection", "call forwarding", or "in conference". The user-desired set status information is transmitted to the control module 260. Additionally, automatic operational status information of the terminal, e.g., "busy", is acquired from the control module 260 and stored into the status setting module 220.

FIG. 6 is a flowchart illustrating a terminal status setting procedure. The two setting modes are the automatic setting mode and the user-setting mode.

The terminal 200 enters the status setting mode at step 600. If user does not select the status setting mode, the terminal selects the automatic setting mode at step 602 and the present operational status items of the terminal are acquired from the control module 260 in step 604 and set into the status setting module 220 in step 606. The automatic set items are transmitted to the status transmission module 230 for generating a status information packet.

If the user selects the user-setting mode in a user main menu at step 608, a user status setting menu table is displayed in step 610, as shown in FIG. 7. In step 612, the user selects one or more user-desired status items with, for example, a scroll key or touch pen. In FIG. 7, the selected items are indicated "V" on the check box. In step 614, the selected user-desired status items are transmitted to the control module 260 for modifying terminal operation. The selected items are also transmitted and stored to the status transmission module 230 for generating a status information packet.

Step 5. Status Information Transmission

The status setting information set in Step 4 is sent to the status transmission module 230. The status transmission module 230 generates a suitable status information packet in the above-described manner and broadcasts the status information packet periodically over the IP network, for example, every few seconds or every tens of seconds. The terminals A and B also perform the Steps 4 and 5 and broadcast their status information respectively.

Step 6. Status Information Collection

Referring to FIG. 8, the terminal 200 receives status information packets periodically broadcasted from the terminals A, B in step 800, extracts source IP addresses and IDs from STS headers and status information from STS data in step 802, and searches the contact list for the extracted IP addresses in step 804. If the extracted IP addresses exist in the contact list, the status collection module 240 makes a status information table for each IP address and its ID, and collects the other parties' status information based on the status information table in step 806.

Step 7. Status Information Display

With continued reference to FIG. 8, in step 808, the user is requested to view the contact list and associated information. If the user desires to view the contact list, a contact list viewer is displayed in the form of a box or a table on an all LCD in step 810. The status information acquired in the previous Step 6 is displayed as a particular icon or message together with IDs (names, phone numbers, IP address or specified images). Alternatively, the IDs and the terminal status information are output by voice. Generally, if a periodically expected status information packet has not been received, a corresponding terminal is considered to be in an unavailable or in a powered-off state.

In accordance with the present invention as described above, a caller can easily check the status of a called terminal or a called party without dialing by periodically transmitting, and receiving, signals indicating the status of his own terminal, and other terminals, between authorized users.

The present invention has the following advantages:

(1) The present invention can be implemented as a novel data service in association with a service provider;

(2) A service provider can charge the data service at a flat rate since the present invention generates a small amount of packet data;

(3) A user can react adaptively to the statuses of other terminals listed in his contact list. For example, if the other party is speaking over the phone or in conference, the user can call him later. The notification of the status of the other party reduces inconvenience to the user;

(4) Even if the called terminal is set to call forwarding, the caller is informed of the call forwarding state beforehand;

(5) In the case of SMS transmission, the user is notified whether the other party has received his SMS message or not; and (6) Calls other than an emergency call can be avoided during a conference call by notifying the other party of the current status of the terminal beforehand. When necessary, the user can set the terminal to "call rejected" or invoke an ARS notification function during a conference. That is, the terminal can operate adaptively to various changes in circumstances.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile communication system for notifying a user of the status of a plurality of mobile terminals over an Internet Protocol (IP) network, the system comprising:

an IP server for receiving a phone number and assigning a unique IP address corresponding to the phone number to at least one of said plurality of mobile terminals;

a status setting module provided in at least one mobile terminal for generating and transmitting a status information packet (SIP) representing a status of the at least one mobile terminal; and setting an operational status or user-desired status of the at least one mobile terminal; and a status collection module provided in at least one other mobile terminal for receiving the SIP and collecting status information of each terminal included in a contact list of a plurality of phone numbers.

2. A mobile communication system as claimed in claim 1, wherein said status information packet comprises:

an IP field including the IP address of a mobile terminal;

a UDP (User Datagram Protocol) field for indicating that the packet is a UDP packet;

a status information header (STS) field for defining an STS protocol, its version and date, a source IP, a destination IP, and a phone number ID; and a status information field representing the status information of the mobile terminal.

3. A mobile communication system as claimed in claim 1, wherein each mobile terminal further comprises:

a contact list generation and IP address collection module for generating a contact list and collecting IP addresses;

a status transmission module for generating said status information packet representing the status of the terminal as set in the status setting module;

a status output module for displaying received status information; and a control module for controlling operations of the at least one mobile terminal.

4. A mobile communication system as claimed in claim 1, further comprising a status output module provided in the at least one terminal and the at least one other terminal for displaying received status information.

5. A mobile communication system as claimed in claim 1, wherein the operational status is a status selected from the group consisting of available, busy, power-off and SMS receivable.

6. A mobile communication system as claimed in claim 1, wherein the user-desired status is a status selected from the group consisting of in-conference, driving, call answering rejected, SMS reception rejected and call forwarding.

7. A mobile communication system as claimed in claim 1, where the IP server exists in a Gateway GPRS Support Node (GGSN).

8. A method for viewing the status of a plurality of mobile terminals over an Internet Protocol (IP) network, the method comprising the steps of:

assigning IP addresses to the plurality of mobile terminals;

requesting the IP addresses of the plurality of mobile terminals by at least one mobile terminal of the plurality of mobile terminals;

broadcasting a status information packet from each of the plurality of mobile terminals over the IP network; and receiving at the at least one mobile terminal the status information packets of the plurality of mobile terminals.

9. A method as claimed in claim 8, further comprising the step of displaying and/or outputting by voice the status information of the plurality of mobile terminals at the at least one mobile terminal.

10. A method as claimed in claim 8, further comprising the steps of:

generating a contact list of phone numbers or names corresponding to the plurality of mobile terminals; and displaying the status information of the plurality of mobile terminals listed on the contact list.

11. A method as claimed in claim 8, further comprising the steps of:
   setting a state of the at least one of the plurality of mobile terminals; and
   generating the status information packet from the set state.

12. A method as claimed in claim 11, wherein the step of setting a state of the least one of the plurality of mobile terminals is automatically set for an operational status by a control module of the mobile terminal or manually set for a use-desired status by a user of the mobile terminal.

13. A method as claimed in claim 8, wherein said status information packet comprises:
   an IP field including the IP address of a terminal;
   a UDP (User Datagram Protocol) field for indicating that the packet is a UDP packet;
   a status information header (STS) field for defining an STS protocol, its version and date, a source IP, a destination IP, and a phone number ID; and
   a status information field representing the status information of the terminal.

14. A method as claimed in claim 10, further comprising the steps of:
   collecting IP addresses generated from the contact list;
   requesting an approval to each terminal included in the contact list and receiving a response of the approval request; and
   collecting status information of the approving terminal included in the contact list.

15. A method as claimed in claim 14, wherein the operational status is a status selected from the group consisting of available, busy, power-off and SMS receivable.

16. A method as claimed in claim 14, wherein the user-desired status is a status selected from the group consisting of in-conference, driving, call answering rejected, SMS reception rejected and call forwarding.

* * * * *